United States Patent
Li

(10) Patent No.: US 8,922,728 B2
(45) Date of Patent: Dec. 30, 2014

(54) LIQUID CRYSTAL DISPLAY CAPABLE OF IMPLEMENTING EIGHT-DOMAIN DIVISION

(75) Inventor: Dong Li, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 13/379,354

(22) PCT Filed: Dec. 2, 2011

(86) PCT No.: PCT/CN2011/083347
§ 371 (c)(1),
(2), (4) Date: Dec. 20, 2011

(87) PCT Pub. No.: WO2013/078670
PCT Pub. Date: Jun. 6, 2013

(65) Prior Publication Data
US 2014/0253835 A1    Sep. 11, 2014

(30) Foreign Application Priority Data

Nov. 28, 2011   (CN) .......................... 2011 1 0384887

(51) Int. Cl.
G02F 1/136 (2006.01)
G02F 1/1343 (2006.01)
G02F 1/1337 (2006.01)
G09G 3/36 (2006.01)

(52) U.S. Cl.
CPC ............ *G02F 1/1337* (2013.01); *G02F 1/1343* (2013.01); *G02F 1/133753* (2013.01); *G02F 2001/134345* (2013.01); *G09G 3/3648* (2013.01)

USPC .................. 349/42; 349/38; 349/39; 349/43; 349/130

(58) Field of Classification Search
CPC .......... G02F 1/1362; G02F 1/133; G09G 3/36
USPC .................................. 349/38, 39, 42, 43, 130
See application file for complete search history.

(56) References Cited

U.S. PATENT DOCUMENTS

| 7,796,104 B2 * | 9/2010 | Kim .............................. 345/87 |
| 2011/0221737 A1 | 9/2011 | Kim |
| 2012/0112987 A1 | 5/2012 | Tan et al. |

FOREIGN PATENT DOCUMENTS

| CN | 101354505 A | 1/2009 |
| CN | 101504829 A | 8/2009 |
| CN | 201289560   | * 8/2009 ............ G02F 1/1362 |
| CN | 201289560 Y | 8/2009 |
| CN | 201867560 U | 6/2011 |

* cited by examiner

*Primary Examiner* — Mike Qi
(74) *Attorney, Agent, or Firm* — Mark M. Friedman

(57) ABSTRACT

Disclosed is a liquid crystal display, which includes a plurality of data lines, a plurality of scan lines, and a plurality of pixels respectively disposed at positions where the scan lines and the data lines cross each other. Each of the pixels includes a main pixel and a sub-pixel. The main pixel includes a main thin film transistor. The sub-pixel includes a sub-thin film transistor. A channel width-to-length ratio of the main thin film transistor is different from a channel width-to-length ratio of the sub-thin film transistor. The liquid crystal display of the present invention implements the eight-domain division by adopting difference channel width-to-length ratios of the main pixel and the sub-pixel.

17 Claims, 2 Drawing Sheets

LIQUID CRYSTAL DISPLAY CAPABLE OF IMPLEMENTING EIGHT-DOMAIN DIVISION

BACKGROUND OF THE INVENTION

1. Field of the Invention

The present invention generally relates to a liquid crystal display technology field, and more particularly to a wide viewing angle liquid crystal display.

2. Description of Prior Art

An angle of visibility of a liquid crystal display is always a key point for judging the liquid crystal display. To solve a color washout problem in the liquid crystal display under a large viewing angle condition, a wide viewing angle technology of the liquid crystal display is developed. An alignment division technology of pixel region is a type of wide viewing angle technology which is widely applied in a vertical alignment (VA) liquid crystal display. In the vertical alignment liquid crystal display, each pixel region is divided into a plurality of alignment regions. Since rotation angles of liquid crystal molecules in the alignment regions are different, a larger viewing angle is formed. The wide viewing angle technology mainly comprises two modes, that is, four-domain and eight-domain division modes. The eight domain division mode used in the market mainly comprises two categories, that is, common electrode voltage modulation (corn-swing) and charge sharing. However, these two categories have defects of a complex driving circuit and a low aperture ratio.

Therefore, there is a need to provide a liquid crystal display for solving the problems in the prior arts.

SUMMARY OF THE INVENTION

An objective of the present invention is to provide a liquid crystal display capable of implementing the eight-domain division by adopting difference channel width-to-length ratios of main pixel and sub-pixel, so as to solve the technical problems of a complex driving circuit and a low aperture ratio in the eight-domain division technology of the conventional liquid crystal display.

To solve the above-mentioned problems, the technical scheme provided by the present invention is as the following.

The present invention relates to a liquid crystal display, comprising a plurality of data lines, a plurality of scan lines, and a plurality of pixels respectively disposed at positions where the scan lines and the data lines cross each other, characterized in that each of the pixels comprises a main pixel and a sub-pixel, the main pixel comprises a main thin film transistor, the sub-pixel comprises a sub-thin film transistor, a channel width-to-length ratio of the main thin film transistor is different from a channel width-to-length ratio of the sub-thin film transistor; an alignment layer for controlling a rotation direction of liquid crystal molecules of the main pixel and a rotation direction of liquid crystal molecules of the sub-pixel is disposed on a transparent electrode layer of the liquid crystal display.

The present invention further relates to a liquid crystal display, comprising a plurality of data lines, a plurality of scan lines, and a plurality of pixels respectively disposed at positions where the scan lines and the data lines cross each other, wherein each of the pixels comprises a main pixel and a sub-pixel, the main pixel comprises a main thin film transistor, the sub-pixel comprises a sub-thin film transistor, a channel width-to-length ratio of the main thin film transistor is different from a channel width-to-length ratio of the sub-thin film transistor.

In the liquid crystal display of the present invention, the channel width-to-length ratio of the main thin film transistor is ranged from 4215.5 to 46/5.5, and the channel width-to-length ratio of the sub-thin film transistor is ranged from 51/5.5 to 64/5.5.

In the liquid crystal display of the present invention, the liquid crystal display comprises the liquid crystal molecules; the main pixel further comprises a main liquid crystal capacitor for driving the liquid crystal molecules of the main pixel to rotate; the sub-pixel further comprises a sub-liquid crystal capacitor for driving the liquid crystal molecules of the sub-pixel to rotate; a capacitance value of the sub-liquid crystal capacitor is different from a capacitance value of the main liquid crystal capacitor.

In the liquid crystal display of the present invention, the capacitance value of the main liquid crystal capacitor is ranged from 0.576 to 0.904 picofarads, and the capacitance value of the sub-liquid crystal capacitor is ranged from 0.522 to 0.783 picofarads.

In the liquid crystal display of the present invention, the main pixel further comprises a main storage capacitor for maintaining a voltage value of the main liquid crystal capacitor; the sub-pixel further comprises a sub-storage capacitor for maintaining a voltage value of the sub-liquid crystal capacitor; a capacitance value of the sub-storage capacitor is different from a capacitance value of the main storage capacitor.

In the liquid crystal display of the present invention, the capacitance value of the main storage capacitor is ranged from 0.761 to 0.764 picofarads, and the capacitance value of the sub-storage capacitor is ranged from 0 to 0.24 picofarads.

In the liquid crystal display of the present invention, the main pixel further comprises a main common electrode, a first main transparent electrode layer, and a second main transparent electrode layer, the first main transparent electrode layer and the second main transparent electrode layer form the main liquid crystal capacitor, and the first main transparent electrode layer arid the main common electrode layer form the main storage capacitor In the liquid crystal display of the present invention, the main thin film transistor has a gate, an input terminal, and an output terminal; the gate is correspondingly connected with one of the scan lines, the input terminal is correspondingly connected with one of the data lines, and the output terminal is connected with the first main transparent electrode layer.

In the liquid crystal display of the present invention, the sub-pixel further comprises a sub-common electrode, a first sub-transparent electrode layer, and a second sub-transparent electrode layer, the first sub-transparent electrode layer and the second sub-transparent electrode layer form the sub-liquid crystal capacitor, and the first sub-transparent electrode layer and the sub-common electrode layer form the sub-storage capacitor.

In the liquid crystal display of the present invention, the sub-thin film transistor has a gate, an input terminal, and an output terminal; the gate is correspondingly connected with one of the scan lines, the input terminal is correspondingly connected with one of the data lines, and the output terminal is connected with the first sub-transparent electrode.

The present invention further relates to a liquid crystal display, comprising a plurality of data lines, a plurality of scan lines, and a plurality of pixels respectively disposed at positions where the scan lines and the data lines cross each other, characterized in that each of the pixels comprises a main pixel and a sub-pixel, the main pixel comprises a main thin film transistor, a main liquid crystal capacitor for driving liquid crystal molecules of the main pixel to rotate, a main storage capacitor for maintaining a voltage value of the main liquid crystal capacitor, the sub-pixel comprises a sub-thin film transistor, a sub-liquid crystal capacitor for driving liquid crystal molecules of the sub-pixel to rotate, a sub-storage capacitor for maintaining a voltage value of the sub-liquid crystal capacitor; a channel width-to-length ratio of the main thin film transistor is ranged from 42/5.5 to 46/5.5, and a channel width-to-length ratio of the sub-thin film transistor is ranged from 51/5.5 to 64/5.5; a capacitance value of the sub-liquid crystal capacitor is different from a capacitance value of the main liquid crystal capacitor; a capacitance value of the sub-storage capacitor is different from a capacitance value of the main storage capacitor.

In the liquid crystal display of the present invention, the capacitance value of the main storage capacitor is ranged from 0.761 to 0.764 picofarads, and the capacitance value of the sub-storage capacitor is ranged from 0 to 0.24 picofarads.

In the liquid crystal display of the present invention, the capacitance value of the main liquid crystal capacitor is ranged from 0.576 to 0.904 picofarads, and the capacitance value of the sub-storage capacitor is ranged from 0.522 to 0.783 picofarads.

In the liquid crystal display of the present invention, an alignment layer for controlling a rotation direction of the liquid crystal molecules of the main pixel and a rotation direction of the liquid crystal molecules of the sub-pixel is disposed on a transparent electrode layer of the liquid crystal display.

The liquid crystal display implementing the present invention has the following advantages. The eight-domain division of the pixel is implemented by adopting difference channel width-to-length ratios of the main pixel and the sub-pixel, so as to solve the technical problems of a complex driving circuit and a low aperture ratio in the eight-domain division technology of the conventional liquid crystal display.

For a better understanding of the aforementioned content of the present invention, preferable embodiments are illustrated in accordance with the attached figures for further explanation:

DETAILED DESCRIPTION OF THE INVENTION

The following descriptions for the respective embodiments are specific embodiments capable of being implemented for illustrations of the present invention with referring to appended figures.

Figure 1:
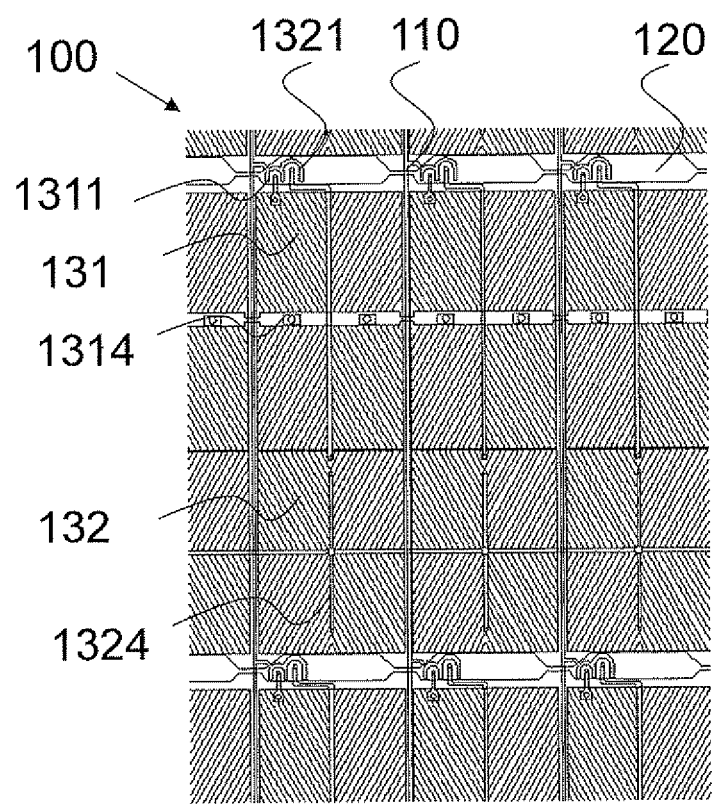
FIG. 1 shows a pixel structural diagram according to a preferred embodiment of a liquid crystal display of the present invention.
Figure 2:
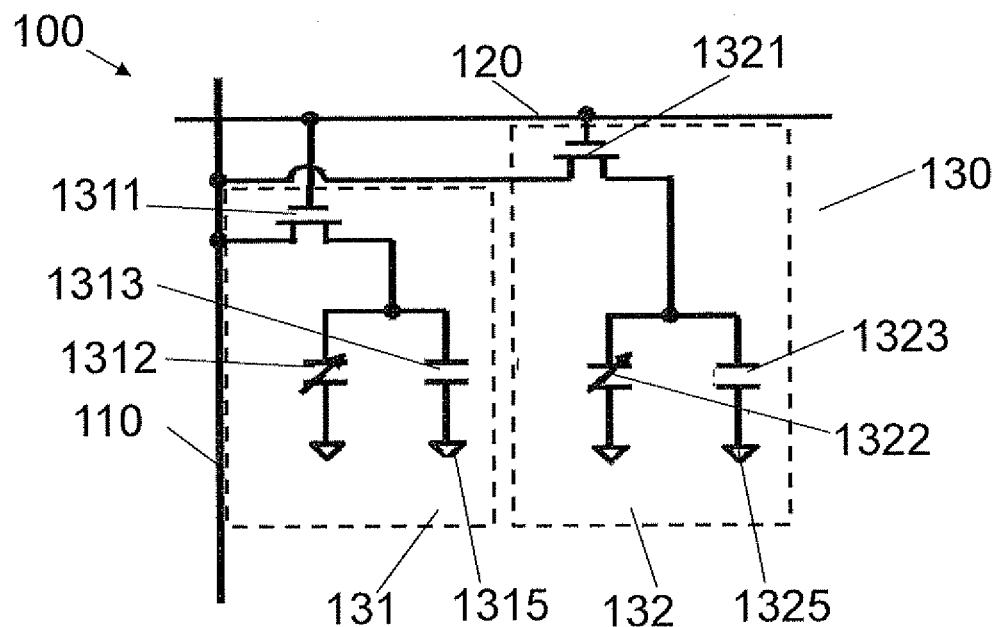
FIG. 2 shows an equivalent circuit of the pixel according to the preferred embodiment of the liquid crystal display of the present invention.

Please refer to FIG. 1 and FIG. 2. FIG. 1 shows a pixel structural diagram according to a preferred embodiment of a liquid crystal display of the present invention. FIG. 2 shows an equivalent circuit of a pixel according to the preferred embodiment of the liquid crystal display of the present invention. The present invention provides a liquid crystal display 100. The liquid crystal display 100 comprises a first substrate (not shown), a second substrate (not shown), and liquid crystal molecules (now shown) disposed between the first substrate and the second substrate. The first substrate comprises a plurality of data lines 110, a plurality of scan lines 120 and a plurality of pixels 130 respectively disposed at positions where the scan lines 120 and the data lines 110 cross each other. Each of the pixels 130 comprises a main pixel 131 and a sub-pixel 132.

The main pixel 131 comprises a main thin film transistor 1311, a main common electrode 1314, a first main transparent electrode layer (not shown) disposed on the first substrate, and a second main transparent electrode layer (not shown) disposed on the second substrate. The first main transparent electrode layer and the second main transparent electrode layer form a main liquid crystal capacitor 1312, while the first main transparent electrode layer and the main common electrode 1314 form a main storage capacitor 1313. The main thin film transistor 1311 comprises a gate, an input terminal (such as a source), and an output terminal (such as a drain) (now shown). The gate of the main thin film transistor 1311 is correspondingly connected with one of the scan lines 120. The input terminal of the main thin film transistor 1311 is correspondingly connected with one of the data lines 110. The output terminal of the main thin film transistor 1311 is connected with the first main transparent electrode layer. The other one terminal of the main storage capacitor 1313 is connected with a main common terminal 1315. The main common terminal 1315 is connected with the main common electrode 1314. A channel width-to-length ratio of the main thin film transistor 1311 is preferably ranged from 42/5.5 to 46/5.5. A capacitance value of the main liquid crystal capacitor 1312 is preferably ranged from 0.576 to 0.904 picofarads. A capacitance value of the main storage capacitor 1313 is preferably ranged from 0.761 to 0.764 picofarads.

The sub-pixel 132 comprises a sub-thin film transistor 1321, a sub-common electrode 1324, a first sub-transparent electrode layer (not shown) disposed on the first substrate, and a second sub-transparent electrode layer (not shown) disposed on the second substrate. The first sub-transparent electrode layer and the second sub-transparent electrode layer form a sub-liquid crystal capacitor 1322, while the first sub-transparent electrode layer and the sub-common electrode 1324 form a sub-storage capacitor 1323. The sub-thin film transistor 1321 comprises a gate, an input terminal (such as a source), and an output terminal (such as a drain) (now shown). The gate of the sub-thin film transistor 1321 is correspondingly connected with one of the scan lines 120. The input terminal of the sub-thin film transistor 1321 is correspondingly connected with one of the data lines 110. The output terminal of the sub-thin film transistor 1321 is connected with the first sub-transparent electrode. The other one terminal of the sub-storage capacitor 1323 is connected with a sub-common terminal 1325. The sub-common terminal 1325 is connected with the sub-common electrode 1324. A channel width-to-length ratio of the sub-thin film transistor 1321 is preferably ranged from 51/5.5 to 64/5.5. A capacitance value of the sub-liquid crystal capacitor 1322 is preferably ranged from 0.522 to 0.783 picofarads. A capacitance value of the sub-storage capacitor 1323 is preferably ranged from 0 to 0.24 picofarads.

The main liquid crystal capacitor 1312 is utilized for driving the liquid crystal molecules of the main pixel 131 to rotate. The sub-liquid crystal capacitor 1322 is utilized for driving the liquid crystal molecules of the sub-pixel 132 to rotate. The main storage capacitor 1313 is utilized for maintaining a voltage value of the main liquid crystal capacitor 1312. The sub-storage capacitor 1323 is utilized for maintaining a voltage value of the sub-liquid crystal capacitor 1322.

As shown in FIG. 2, when a voltage is applied to the scan line 120, the main thin film transistor 1311 and the sub-thin film transistor 1321 are turned on. The data line 110 charges the main liquid crystal capacitor 1312 and the main storage capacitor 1313 through the main thin film transistor 1311. The data line 110 charges the sub-liquid crystal capacitor 1322 and the sub-storage capacitor 1323 through the sub-thin film transistor 1321. Since the channel width-to-length ratio of the main thin film transistor 1311 is smaller than the channel width-to-length ratio of the sub-thin film transistor 1321, a charge speed of the sub-pixel 132 is faster than a charge speed of the main pixel 131, so that brightness of the sub-pixel 132 is higher than brightness of the main pixel 131 during charging.

When the voltage stops applying to the scan line 120, the main thin film transistor 1311 and the sub-thin film transistor 1321 are turned off. However, the main thin film transistor 1311 and the sub-thin film transistor 1321 cannot be turned off totally. When the voltage stops applying to the scan line 120, leakage currents exist in the main thin film transistor 1311 and the sub-thin film transistor 1321. Charges stored in the main liquid crystal capacitor 1312 and the main storage capacitor 1313 are discharged through the main thin film transistor 1311. Charges stored in the sub-liquid crystal capacitor 1322 and the sub-storage capacitor 1323 are discharged through the sub-thin film transistor 1321. Since the channel width-to-length ratio of the main thin film transistor 1311 is smaller than the channel width-to-length ratio of the sub-thin film transistor 1321, a discharge speed of the sub-pixel 132 is faster than a discharge speed of the main pixel 131. Accordingly, the brightness of the main pixel 131 is higher than the brightness of the sub-pixel 132 during discharging.

As the preferred embodiment of the liquid crystal display of the present invention, the capacitance value of the sub-liquid crystal capacitor 1322 is smaller than the capacitance value of the main liquid crystal capacitor 1312. Since the channel width-to-length ratio of the sub-thin film transistor 1321 is larger, the charge speed of the sub-pixel 132 is faster when the pixel 130 is charged. Furthermore, the capacitance value of the sub-liquid crystal capacitor 1322 of the sub-pixel 132 is smaller, so that the voltage of the sub-pixel 132 can reach a predetermined voltage value rapidly. As a result, a response speed of the liquid crystal molecules of the sub-liquid crystal capacitor 1322 can be increased, and a brightness difference between the main pixel 131 and the sub-pixel 132 can be increased. When the pixel 130 is discharged, the capacitance value of the sub-liquid crystal capacitor 1322 is smaller. As a result, the discharge speed of the sub-pixel 132 can be accelerated for increasing the response speed of the liquid crystal molecules, and the brightness difference between the main pixel 131 and the sub-pixel 132 can be increased.

In the present embodiment, the channel width-to-length ratio of the main thin film transistor 1311 is smaller than the channel width-to-length ratio of the sub-thin film transistor 1321, while the capacitance values of the main liquid crystal capacitor 1312 and the main storage capacitor 1313 are respectively larger than the capacitance values of the sub-liquid crystal capacitor 1322 and the sub-storage capacitor 1323. Certainly, in another embodiment, as long as the channel width-to-length ratio of the main thin film transistor 1311, the capacitance value of the main liquid crystal capacitor 1312, and the capacitance value of the main storage capacitor 1313 are respectively different from the channel width-to-length ratio of the sub-thin film transistor 1321, the capacitance value of the sub-liquid crystal capacitor 1322, the capacitance value of the sub-storage capacitor 1323, the channel width-to-length ratio of the main thin film transistor 1311 can be designed to be larger than the channel width-to-length ratio of the sub-thin film transistor 1321, and the capacitance values of the main liquid crystal capacitor 1312 and the main storage capacitor 1313 can be respectively designed to be smaller than the capacitance values of the sub-liquid crystal capacitor 1322 and the sub-storage capacitor 1323.

In the liquid crystal display of the present invention, the channel width-to-length ratio of the main thin film transistor 1311 of the pixel 130 is different from the channel width-to-length ratio of the sub-thin film transistor 1321, so that the charge states and the discharge states of the main pixel 131 and the sub-pixel 132 of the pixel 130 are different. The thin film transistor having a smaller channel width-to-length ratio has a smaller conduction factor. Accordingly, the charge speed and the discharge speed of the corresponding sub-pixel are slower, so that the rotation speed of the liquid crystal molecules is slower. The sub-pixel (the main pixel 131 or the sub-pixel 132) of the thin film transistor having a smaller channel width-to-length ratio is darker when it is charged. The sub-pixel (the main pixel 131 or the sub-pixel 132) of the thin film transistor having a smaller channel width-to-length ratio is brighter when it is discharged.

As the preferred embodiment of the present invention, the capacitance value of the sub-storage capacitor 1323 is smaller than the capacitance value of the main storage capacitor 1313. The smaller capacitance value of the sub-storage capacitor 1323 decreases the maintaining ability of charge, so that the discharge speed of the sub-pixel 1322 is accelerated and the brightness difference between the main pixel 131 and the sub-pixel 132 is increased. Furthermore, when the capacitance value of the sub-storage capacitor 1323 is designed to be smaller, the transparent area and the aperture ratio of the liquid crystal display 100 can be increased. Preferredly, the capacitance value of the sub-storage capacitor 1323 is zero, that is, the sub-common electrode 1324 for forming the sub-storage capacitor 1323 is not disposed, so that the transparent area and the aperture ratio of the liquid crystal display 100 are largest.

Figure 3:
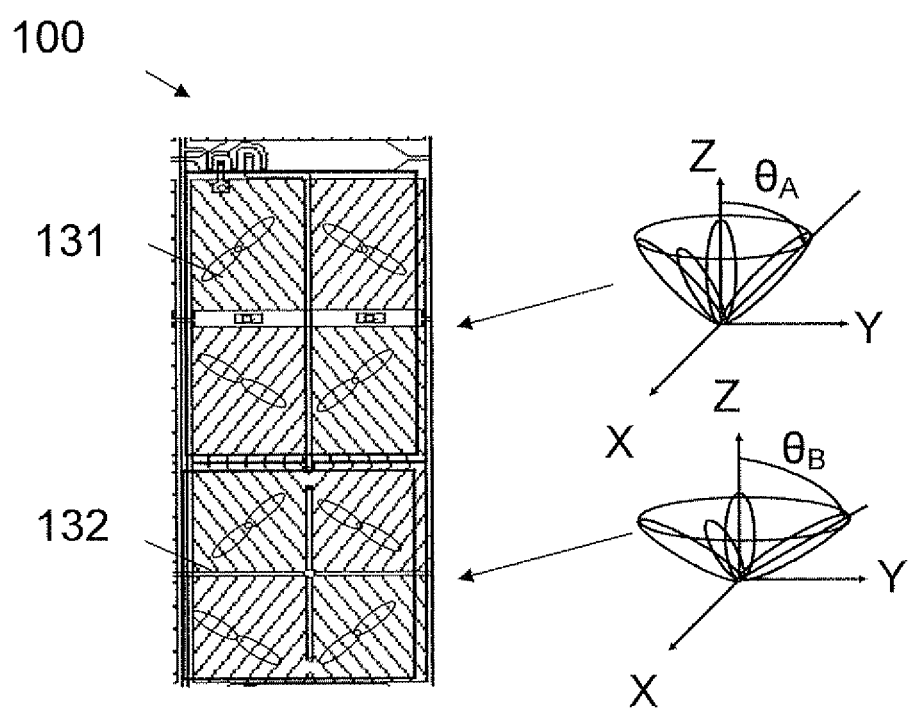
FIG. 3 shows a structural view of the pixel and the tilted liquid crystal molecules according to the preferred embodiment of the liquid crystal display of the present invention.

As the preferred embodiment of the present invention, FIG. 3 shows the pixel and the tilted liquid crystal molecules according to the preferred embodiment of the liquid crystal display of the present invention. An alignment layer (now shown) for controlling the rotation directions of the liquid crystal molecules of the main pixel 131 and the sub-pixel 132 is disposed on the transparent electrode layers of the liquid crystal display 100.

As shown in FIG. 3, protrusions are formed on surfaces of the transparent electrode layers of the main pixel 131 and the sub-pixel by etching, so that the alignment layer using the four-domain division technology is formed on the surface of the transparent electrode layers. The alignment layer has four alignment directions. The liquid crystal molecules corresponding to the alignment directions are respectively rotated to different angles. If the pixel is driven by the conventional driving method, the voltages of the main pixel 131 and the sub-pixel 132 always maintain the same during the charge stage and the discharge stage and thus only the four-domain division of one pixel can be implemented. In the liquid crystal display 100 of the present invention, the channel width-to-length ratio of the main thin film transistor of the main pixel 131 is different from the channel width-to-length ratio of the sub-thin film transistor of the sub-pixel 132. When an angle formed between the liquid crystal molecules of the main pixel 131 and a vertical direction is $\Theta_A$ and an angle formed between the liquid crystal molecules of the sub-pixel 132 and the vertical direction is $\Theta_B$, ($\Theta_A$ is not equal to $\Theta_B$) by applying voltages to the transparent electrode layers, the brightness of the main pixel 131 is different from the brightness of the sub-pixel 132. As a result, the eight-domain division of one pixel can be easily implemented, and a function of wide viewing angle can be implemented by synthesizing the brightness of the main pixel 131 and the brightness of the sub-pixel 132 by human eyes.

In conclusion, the present invention implements the eight-domain division of the pixel 130 by disposing the different channel width-to-length ratios of the main thin film transistor 1311 of the main pixel 131 and the sub-thin film transistor 1321 of the sub-pixel 132 when the transparent electrode layers corresponding to the pixel 130 are divided into four domains. Compared with the prior arts, the driving circuit of the present invention is simple, and the aperture ratio of the liquid crystal display is increased.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A liquid crystal display capable of implementing eight-domain division, comprising a plurality of data lines, a plurality of scan lines, and a plurality of pixels respectively disposed at positions where the scan lines and the data lines cross each other, characterized in that each of the pixels comprises a main pixel and a sub-pixel, the main pixel comprises a main thin film transistor, the sub-pixel comprises a sub-thin film transistor, a channel width-to-length ratio of the main thin film transistor is different from a channel width-to-length ratio of the sub-thin film transistor;
    an alignment layer for controlling a rotation direction of liquid crystal molecules of the main pixel and a rotation direction of liquid crystal molecules of the sub-pixel is disposed on a transparent electrode layer of the liquid crystal display,
    wherein the channel width-to-length ratio of the main thin film transistor is ranged from 42/5.5 to 46/5.5, and the channel width-to-length ratio of the sub-thin film transistor is ranged from 51/5.5 to 64/5.5.

2. The liquid crystal display capable of implementing eight-domain division of claim 1, characterized in that the liquid crystal display comprises the liquid crystal molecules;
    the main pixel further comprises a main liquid crystal capacitor for driving the liquid crystal molecules of the main pixel to rotate;
    the sub-pixel further comprises a sub-liquid crystal capacitor for driving the liquid crystal molecules of the sub-pixel to rotate;
    a capacitance value of the sub-liquid crystal capacitor is different from a capacitance value of the main liquid crystal capacitor.

3. The liquid crystal display capable of implementing eight-domain division of claim 2, characterized in that the capacitance value of the main liquid crystal capacitor is ranged from 0.576 to 0.904 picofarads, and the capacitance value of the sub-liquid crystal capacitor is ranged from 0.522-0.783 picofarads.

4. The liquid crystal display capable of implementing eight-domain division of claim 2, characterized in that the main pixel further comprises a main storage capacitor for maintaining a voltage value of the main liquid crystal capacitor;
    the sub-pixel further comprises a sub-storage capacitor for maintaining a voltage value of the sub-liquid crystal capacitor;
    a capacitance value of the sub-storage capacitor is different from a capacitance value of the main storage capacitor.

5. The liquid crystal display capable of implementing eight-domain division of claim 4, characterized in that the capacitance value of the main storage capacitor is ranged from 0.761 to 0.764 picofarads, and the capacitance value of the sub-storage capacitor is ranged from 0 to 0.24 picofarads.

6. A liquid crystal display capable of implementing eight-domain division, comprising a plurality of data lines, a plurality of scan lines, and a plurality of pixels respectively disposed at positions where the scan lines and the data lines cross each other, characterized in that each of the pixels comprises a main pixel and a sub-pixel, the main pixel comprises a main thin film transistor, the sub-pixel comprises a sub-thin film transistor, a channel width-to-length ratio of the main thin film transistor is different from a channel width-to-length ratio of the sub-thin film transistor,
    wherein the channel width-to-length ratio of the main thin film transistor is ranged from 42/5.5 to 46/5.5, and the channel width-to-length ratio of the sub-thin film transistor is ranged from 51/5.5 to 64/5.5.

7. The liquid crystal display capable of implementing eight-domain division of claim 6, characterized in that the liquid crystal display comprises liquid crystal molecules;
    the main pixel further comprises a main liquid crystal capacitor for driving the liquid crystal molecules of the main pixel to rotate;
    the sub-pixel further comprises a sub-liquid crystal capacitor for driving the liquid crystal molecules of the sub pixel to rotate;
    a capacitance value of the sub-liquid crystal capacitor is different from a capacitance value of the main liquid crystal capacitor.

8. The liquid crystal display capable of implementing eight-domain division of claim 7, characterized in that the capacitance value of the main liquid crystal capacitor is ranged from 0.576 to 0.904 picofarads, and the capacitance value of the sub-liquid crystal capacitor is ranged from 0.522 to 0.783 picofarads.

9. The liquid crystal display capable of implementing eight-domain division of claim 7, characterized in that the main pixel further comprises a main storage capacitor for maintaining a voltage value of the main liquid crystal capacitor;
    the sub-pixel further comprises a sub-storage capacitor for maintaining a voltage value of the sub-liquid crystal capacitor;
    a capacitance value of the sub-storage capacitor is different from a capacitance value of the main storage capacitor.

10. The liquid crystal display capable of implementing eight-domain division of claim 9, characterized in that the capacitance value of the main storage capacitor is ranged from 0.761 to 0.764 picofarads, and the capacitance value of the sub-storage capacitor is ranged from 0 to 0.24 picofarads.

11. The liquid crystal display capable of implementing eight-domain division of claim 9, characterized in that the main pixel further comprises a main common electrode, a first main transparent electrode layer, and a second main transparent electrode layer, the first main transparent electrode layer and the second main transparent electrode layer form the main liquid crystal capacitor, and the first main transparent electrode layer and the main common electrode layer form the main storage capacitor.

12. The liquid crystal display capable of implementing eight-domain division of claim 11, characterized in that the main thin film transistor has a gate, an input terminal, and an output terminal;

the gate is correspondingly connected with one of the scan lines, the input terminal is correspondingly connected with one of the data lines, and the output terminal is connected with the first main transparent electrode layer.

13. The liquid crystal display capable of implementing eight-domain division of claim 9, characterized in that the sub-pixel further comprises a sub-common electrode, a first sub-transparent electrode layer, and a second sub-transparent electrode layer, the first sub-transparent electrode layer and the second sub-transparent electrode layer form the sub-liquid crystal capacitor, and the first sub-transparent electrode layer and the sub-common electrode layer form the sub-storage capacitor.

14. The liquid crystal display capable of implementing eight-domain division of claim 13, characterized in that the sub-thin film transistor has a gate, an input terminal, and an output terminal;

the gate is correspondingly connected with one of the scan lines, the input terminal is correspondingly connected with one of the data lines, and the output terminal is connected with the first sub-transparent electrode.

15. A liquid crystal display capable of implementing eight-domain division, comprising a plurality of data lines, a plurality of scan lines, and a plurality of pixels respectively disposed at positions where the scan lines and the data lines cross each other, characterized in that each of the pixels comprises a main pixel and a sub-pixel, the main pixel comprises a main thin film transistor, a main liquid crystal capacitor for driving liquid crystal molecules of the main pixel to rotate, a main storage capacitor for maintaining a voltage value of the main liquid crystal capacitor, the sub-pixel comprises a sub-thin film transistor, a sub-liquid crystal capacitor for driving liquid crystal molecules of the sub-pixel to rotate, a sub-storage capacitor for maintaining a voltage value of the sub-liquid crystal capacitor;

a channel width-to-length ratio of the main thin film transistor is ranged from 42/5.5 to 46/5.5, and a channel width-to-length ratio of the sub-thin film transistor is ranged from 51/5.5 to 64/5.5;

a capacitance value of the sub-liquid crystal capacitor is different from a capacitance value of the main liquid crystal capacitor;

a capacitance value of the sub-storage capacitor is different from a capacitance value of the main storage capacitor.

16. The liquid crystal display capable of implementing eight-domain division of claim 15, characterized in that the capacitance value of the main storage capacitor is ranged from 0.761 to 0.764 picofarads, and the capacitance value of the sub-storage capacitor is ranged from 0 to 0.24 picofarads.

17. The liquid crystal display capable of implementing eight-domain division of claim 15, characterized in that the capacitance value of the main liquid crystal capacitor is ranged from 0.576 to 0.904 picofarads, and the capacitance value of the sub-liquid crystal capacitor is ranged from 0.522 to 0.783 picofarads.

* * * * *